US010803103B2

(12) United States Patent
Sano et al.

(10) Patent No.: US 10,803,103 B2
(45) Date of Patent: Oct. 13, 2020

(54) TEXT MATCHING DEVICE AND METHOD, AND TEXT CLASSIFICATION DEVICE AND METHOD

(71) Applicant: National Institute of Information and Communications Technology, Tokyo (JP)

(72) Inventors: Motoki Sano, Tokyo (JP); Istvan Varga, Tokyo (JP); Kentaro Torisawa, Tokyo (JP); Chikara Hashimoto, Tokyo (JP); Kiyonori Ootake, Tokyo (JP); Takao Kawai, Tokyo (JP); Jonghoon Oh, Tokyo (JP); Stijn De Saeger, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 1337 days.

(21) Appl. No.: 14/898,565

(22) PCT Filed: May 15, 2014

(86) PCT No.: PCT/JP2014/062912
§ 371 (c)(1),
(2) Date: Dec. 15, 2015

(87) PCT Pub. No.: WO2014/203659
PCT Pub. Date: Dec. 24, 2014

(65) Prior Publication Data
US 2016/0140217 A1    May 19, 2016

(30) Foreign Application Priority Data

Jun. 19, 2013 (JP) ................................ 2013-128454

(51) Int. Cl.
*G06N 20/00* (2019.01)
*G06F 16/33* (2019.01)
(Continued)

(52) U.S. Cl.
CPC ...... *G06F 16/3344* (2019.01); *G06F 16/3329* (2019.01); *G06F 16/353* (2019.01);
(Continued)

(58) Field of Classification Search
CPC .......... G06F 40/20; G06F 40/30; G06F 40/40; G06F 16/35; G06F 16/353; G06F 40/10;
(Continued)

(56) References Cited

U.S. PATENT DOCUMENTS

2006/0123000 A1* 6/2006 Baxter ................... G06F 16/86
2010/0063797 A1   3/2010 Cong et al.
(Continued)

FOREIGN PATENT DOCUMENTS

| JP | 2005-071229 A | 3/2005 |
| KR | 20120061133 A | 6/2012 |
| WO | WO 2013/003100 A2 | 1/2013 |

OTHER PUBLICATIONS

International Search report for corresponding International Application No. PCT/JP2014/062912 dated Jul. 29, 2014.
(Continued)

*Primary Examiner* — Li Wu Chang
(74) *Attorney, Agent, or Firm* — Renner, Otto, Boisselle & Sklar, LLP

(57) ABSTRACT

[Object] To provide a system for automatically and reliably collecting information belonging to a given category, and matching the information appropriately in a timely manner. [Solution] A text classifying device 30 analyzes dependency of collected texts by a morpheme analyzing unit 52 and a dependency analyzing unit 54. A problem report collecting
(Continued)

unit 64 specifies a core consisting of noun+predicate in a text based on dependency relation of the text, and using a combination of noun classification (trouble/non-trouble) and predicate classification (excitatory/inhibitory), classifies the text to a problem report or the rest, by a method referred to as core-based matrix. Support information collecting device 66 and request message collecting device 68 collect support information and request messages in the similar manner. A matching device 76 matches problem reports and support information collected by problem report collecting unit 64 and support information collecting device 66 by a method referred to as co-occurrence core matrix, and thus associates problem information (support information) with appropriate support information (problem information).

12 Claims, 6 Drawing Sheets

(51) Int. Cl.
  G06F 16/35 (2019.01)
  G06F 16/332 (2019.01)
  G06F 40/211 (2020.01)
  G06N 5/04 (2006.01)
(52) U.S. Cl.
  CPC ............ G06F 40/211 (2020.01); G06N 5/04 (2013.01); G06N 20/00 (2019.01)
(58) Field of Classification Search
  CPC .... G06F 40/205; G06F 40/211; G06F 40/279; G06F 40/284
  See application file for complete search history.

(56) References Cited

U.S. PATENT DOCUMENTS

2012/0101807 A1    4/2012  Heo
2013/0268534 A1*  10/2013  Mathew ................ G06F 40/20
                                                          707/740

OTHER PUBLICATIONS

Aron Culotta, "Lightweight methods to estimate influenza rates and alcohol sales volume from Twitter messages", Language Resources and Evaluation, 2012, pp. 1-22.

Vieweg et al., "Microblogging during two natural hazards events: what twitter may contribute to situational awareness." In Proceedings of the SIGCHI Conference on Human Factors in Computing Systems, CHI '10, 2010 pp. 1079-1088, New York, NY, USA. ACM.

Goldberg et al., "All Your Wishes Come True: A Study of Wishes and How to Recognize Them", In Human Language Technologies: The 2009 Annual Conference of the North American Chapter of the ACL, May 2009, pp. 263-271, Boulder, Colorado, USA. ACM.

Kanayama et al., "Textual demand analysis: Detection of users' wants and needs from opinions." In Proceedings of the 22nd International Conference on Computational Linguistics (Coling 2008), pp. 409-416, Manchester, UK, August. Coling 2008 Organizing Committee.

Robert Munro, "Subword and spatiotemporal models for identifying actionable information in Haitian Kreyol." In Proceedings of the Fifteenth Conference on Computational Natural Language Learning, 2011, pp. 68-77, Portland, Oregon. ACM.

* cited by examiner

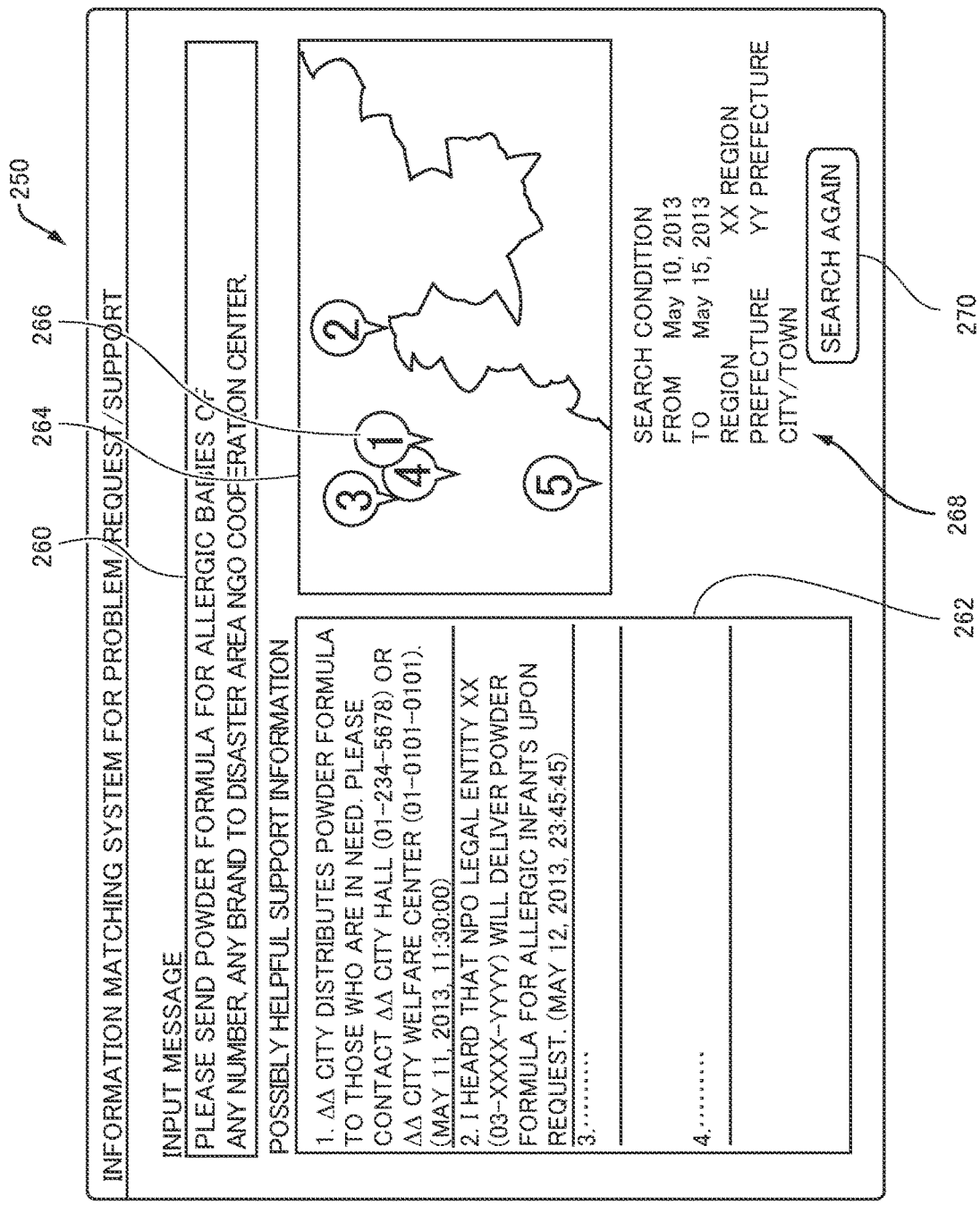

TEXT MATCHING DEVICE AND METHOD, AND TEXT CLASSIFICATION DEVICE AND METHOD

TECHNICAL FIELD

The present invention relates to a technique for organizing and presenting to a user pieces of information on a network such as the Internet and, more specifically, to a system of matching information posted on various systems on a network and efficiently providing a user who requires information with the needed information.

BACKGROUND ART

The Internet has become common and various systems operate thereon. By way of example, on the Internet, not only web-pages and blogs but also so-called social network services (SNS) such as Twitter, Facebook and LinkedIn enjoy great popularity. Such systems are used for exchanging information among users, enabling flow of information in a way unimaginable before the prevalence of the Internet. A formidable amount of information flows constantly on such systems and, hence, when a person is looking for an answer to a certain problem, it is highly likely that the wanted answer exists among the information. It is impossible, however, to pinpoint the information he/she is looking for from the vast information.

A so-called information retrieval service aims to meet such a demand. A typical information retrieval service constantly collects a huge amount of information on the Internet, builds a database or databases and provides indexes. When a search request for a certain piece of information (for example, information search request with a designated keyword) is received, (a group of) computers of a site providing such a service retrieve related pieces of information by index-search using the keyword, add a score (a numerical value representing relevance of the answer to the search request) defined based on information search technique to each piece, and return data to the user who requested the search in a descending order of the score. The information is presented to the user in an order considered appropriate as providing answers to the search request using the keyword. As a result, it is to some extent possible for the user to obtain information he/she needs by connecting to and using such an information retrieval service.

With the overwhelming amount of information on the Internet, however, it is sometimes very difficult for a user to find the information he/she really wants by information search. For example, when a large number of items are displayed and pieces of unwanted information are high on the list, the user must add an appropriate keyword or keywords, change the keyword or keywords or change search conditions to narrow down the search results. If too much information is offered at the start, however, it is very difficult to find a keyword or keywords that can lead to accurate information.

It is very likely, however, that if there is a certain problem, there is a solution thereto, and if there is a piece of support information, there is some description of a person who needs and requests such a support (such description will be hereinafter referred to as "request message"), on the Internet. Assume, for example, that a user writes a problem on his blog, such as a message "My sister suffers from atopy." Such a description reporting a problem will be hereinafter referred to as a "problem report." There is definitely useful information as solutions to such a problem on the web. For example, there may be a description "I heard from a doctor in my neighborhood that tencha (Chinese blackberry) is effective against atopy." In the following, such a piece of information will be referred to as "support information." Further, assume that a description requesting some help such as "Application X running on a certain OS of my computer has abended. Please advise how to prevent my application from abend" is posted. It is almost certain that a solution such as "Software Y prevents abend of application X" exists on the web. Since there is overwhelming information on the Internet as described above, it is very difficult for a user to find the exact information he/she wants. This problem becomes bigger as the amount of information on the Internet increases and it becomes more challenging to solve if the information requested by the user becomes more specific.

Such a problem comes to the surface especially at the time of a disaster. Today, the Internet will be flooded with a huge amount of information in the wake of a disaster. Telephones may possibly fail. Therefore, people-to-people communications as well as communications among organizations become increasingly difficult.

The biggest problem at the time of a disaster is how to promptly assist the disaster victims and how to find matching between supports needed by the victims and the supports provided by supporter groups and the like in an effective and sustainable way. Smooth communication between disaster victims and support groups could possibly enable speedy assistance to victims. Communication between the victims and support groups at the time of a disaster, however, is extremely difficult as described above. Information increases even more as time passes, and it becomes more difficult to find a necessary piece of information. This leads to a situation that appropriate emergency relief goods cannot be delivered timely to disaster victims in need of specific help.

For example, at the time of Great East Japan Earthquake in March, 2011, a large number of problem reports such as "powder formula for allergic babies runs short in such-and-such City" and a large number of request messages such as "please send powder formula for allergic babies to such-and-such City" were posted by the victims. These pieces of information, however, were buried in the overwhelming amount of information generated in the wake of the earthquake, and most of these pieces of information were left unnoticed by administrative bodies, support groups and volunteers who could have provided the support. On the other hand, though support information such as "2000 cans of powder formula for allergic babies are sent to such-and-such City" were posted by the administrative bodies, support groups and volunteers, such information did not reach the victims in need of such information. Even in a lucky situation that administrative bodies, support groups and volunteers successfully recognized problems and requests from the victims, more than necessary emergency relief goods were concentrated to one location as many organizations respond to the same problem and same request. As a result, the relief goods as well as time were wasted, and caused a new problem of difficulty to keep the relief goods. Essentially, once the necessary amount of relief goods are delivered to some victims, the remaining goods should be delivered to other victims. Such a problem arises from failed communication between those who actually in need of support and those who offer helping hands.

Such problems occur not only at the time of disasters but on a day-to-day basis. Assume that you are looking for an answer to a problem related to your computer, or looking for measures of atopy. It may be possible to search for solutions on a so-called search service site. Information that can be searched at the search site, however, includes not only the solutions to the problem but also huge amount of other information. Therefore, a search site is not very convenient for a user who is looking for a solution to a specific problem, particularly for a user to whom prompt discovery of an appropriate solution matters.

On the other hand, it is also difficult for a user who is willing to offer his/her solutions to a problem to another user who needs the solution. If he/she happens to know that another user looks for a solution to the problem and he/she knows the solution to the problem, it is not difficult to contact the user to offer the solution. Such a situation rarely occurs on the Internet, where a huge number of people post huge amount of information. A scheme for passing useful information timely to appropriate person or organization is desired. For this purpose, a technique of collecting problem reports, request messages and support information and find good matching among these is necessary.

SUMMARY OF INVENTION

Technical Problem

As regards the technique of specifying and collecting problem reports, Aron Culotta 2012, "Lightweight methods to estimate influenza rates and alcohol sales volume from twitter messages. Language Resources and Evaluation", pages 1-22 discloses a technique of specifying and collecting problem reports related to spread of influenza among messages posted on SNS. Further, Sarah View eg, Amanda L. Hughes, Kate Starbird, and Leysia Palen, 2010, "Microblogging during two natural hazards events: what twitter may contribute to situational awareness." In Proceedings of the SIGCHI Conference on Human Factors in Computing Systems, CHI '10, pages 1079-1088, New York, N.Y., USA. ACM discloses a technique of specifying and collecting problem reports related to wildfire among messages posted on SNS. These techniques, however, have the following problems.

These prior art techniques specify and collect problem reports by limiting the object, for example, to a specific disaster (example: wildfire) or an infectious illness (example: influenza). It is often the case, however, that one problem evolves to other, unexpected problems, particularly at the time of a disaster. For instance, in Great East Japan Earthquake, the earthquake caused tsunami and lead to a nuclear accident. Further, carbon monoxide poisoning occurred because of insufficient air ventilation in rooms shut for fear of emitted radioactivity. Specifically, collecting problem reports in limited category is insufficient, and problem reports must be specified and collected without such limitation. If this becomes possible, not only the problems in the specific category but also secondary problems derived therefrom can be specified and collected.

As regards the technique of specifying and collecting request messages, a technique of creating a message classifier through supervised learning and thereby specifying and collecting request messages is disclosed in Andrew B. Goldberg, Nathanael Fillmore, David Andrzejewski Zhiting Xu, Bryan Gibson and Xiaojin Zhu 2009, May, "All Your Wishes Come True: A Study of Wishes and How to Recognize Them." In Human Language Technologies: The 2009 Annual Conference of the North American Chapter of the ACL, pages 263-271, Boulder, Colo., USA. ACM. Similarly, a technique of creating a classifier through unsupervised learning and thereby specifying and collecting request messages is disclosed in Hiroshi Kanayama and Tetsuya Nasukawa, 2008, "Textual demand analysis: Detection of users' wants and needs from opinions." In Proceedings of the 22nd International Conference on Computational Linguistics (Coling 2008), pages 409-416, Manchester, UK, August. Coling 2008 Organizing Committee. These techniques utilize a so-called machine learning technique.

In these classifiers, a list of expressions referred to as request templates or request markers (example: 〜ほしい (I wish . . . ,), 〜ください (Please . . . ,)) is used as general features, and the classifiers can collect only the pieces of information matching or similar to such expressions. Therefore, it is necessary to find a new feature, separate from above, which contributes to specifying requests.

Further, a technique for collecting request messages and support information is disclosed in Robert Munro, 2011, "Subword and spatiotemporal models for identifying actionable information in Haitian Kreyol." In Proceedings of the Fifteenth Conference on Computational Natural Language Learning, pages 68-77, Portland, Oreg. ACM. According to this technique, request messages and support information are collected without distinguishing each other. Practically, however, if automatic matching between problem messages and support information or between request messages and support information is to be effected, distinction between request messages and support information is indispensable, and hence, it cannot be attained by the prior art alone.

Further, at present, we cannot find any technique capable of collecting and automatically matching problem reports and support information as solutions to the reported problem on the network, or any technique capable of automatically collecting and matching request messages and support information satisfying the request expressed in the request message on the network. In order to realize matching between problem messages and support information, a technique of specifying what type of support information is necessary based on expressions in the problem message, or a technique of specifying what problem message is involved, based on expressions in the support information, is necessary. To date, it has been considered difficult to automatically attain such techniques.

Therefore, an object of the present invention is to provide a text matching device and a text classifying device capable of collecting, automatically in a reliable manner, pieces of information belonging to a certain category such as general problem reports and request messages as well as support information for solving the reported problem or to meet the request, and capable of appropriately matching these pieces of information on a timely basis.

Solution to Problem

According to a first aspect, the present invention provides a text matching device, matching, in a set of texts classified to a first or second category, a text in the first category with a text in the second category. A text included in the set is classified to the first or second category by a text classifying device using machine learning, using as features, one or a plurality of morphemes forming the text, dependency information of the one or a plurality of morphemes, and a combination of a noun classification and a predicate classification in a core of a sentence consisting of a combination of a noun included in the text and a predicate on which the noun depends. The text matching device includes: storage means for storing texts of the first category and the second category distinguished from each other; text pair generating means for generating a text pair consisting of a text of the first category and a text of the second category; features-for-matching generating means for generating, from the pair, features-for-matching, including the features used when the text in the pair generated by the text pair generating means is classified by the text classifying device; and matching means for determining, using the features-for-matching generated by the features-for-matching generating means, whether two texts forming the pair match or not. The matching means includes a machine learning model pre-trained using training data for matching in advance, to determine whether a pair of texts matches based on the features-for-matching.

Preferably, the features-for-matching further include n-grams on a sub-tree of a dependency relation including a noun in the core. Any of the n-grams includes a piece of time information, a piece of regional information, a morpheme representing modality of each text, or an arbitrary combination of these.

More preferably, one of the first and second categories is a category comprised of texts representing problem reports, and the other is a category comprised of texts representing support information for solving problems.

One of the first and second categories may be a category comprised of texts representing requests for solving problems, and the other may be a category comprised of texts representing support information for solving problems.

According to a second aspect, the present invention provides a text classifying device for classifying a text to a specific category related to problem report or solution, suitably used with the text matching system of the first aspect. The device includes: morpheme analyzing means for performing morphological analysis of the text and outputting a sequence of morphemes with a piece of part-of-speech information; dependency analyzing means for analyzing dependency between morphemes of the sequence of morphemes output from the morpheme analyzing means, and outputting a piece of dependency information representing dependency relation of the text; and classifying means for specifying, based on the sequence of morphemes and the dependency relation of text, a core of a sentence consisting of a noun included in the text and a predicate on which the noun depends, and for classifying the text to the specific category or to another category, using a combination of classification of the noun in the core and classification of the predicate.

Preferably, the classifying means includes: core specifying means for specifying, based on the sequence of morphemes and the dependency relation of the text, a core of a sentence consisting of a noun included in the text and a predicate on which the noun depends; noun classifying means for classifying a noun in the core specified by the core specifying mans to a problem-noun related to occurrence of a problem or a non-problem-noun unrelated to occurrence of a problem; predicate classifying means for classifying a predicate in the core specified by the core specifying means to a predicate indicating that an object function represented by the noun depending on the predicate becomes excitatory, or a predicate indicating that the object function becomes inhibitory; and means for classifying, for the core specified by the core specifying means, the text to the specific category or to another category, based on a combination of a result of classification of the noun in the core classified by the noun classifying means and a result of classification of the predicate on which the noun depends classified by the predicate classifying means.

More preferably, the means for classifying includes determining means based on machine learning, for determining whether a given text belongs to the specific category or not, using as features at least a piece of information representing, for the core specified by the core specifying means, a combination of a result of classification by the noun classifying means of a noun in the core and a result of classification by the predicate classifying means of the predicate on which the noun depends in the core.

The features further include n-grams on a sub-tree of a dependency relation including a noun in the core found for each text; and any of the n-grams may include a piece of time information, a piece of regional information, a morpheme representing modality of each text, or an arbitrary combination of these.

According to a third aspect, the present invention provides a computer program causing, when executed on a computer, the computer to function as all the means of any of the above-described text classifying device or the text matching device.

According to a further aspect, the present invention provides a text matching method of matching, in a set of texts classified to a first or second category, a text in the first category with a text in the second category. A text included in the set is classified to the first or second category by a text classifying device using machine learning, using as features, one or a plurality of morphemes forming the text, dependency information of the one or a plurality of morphemes, and a combination of a noun classification and a predicate classification in a core of a sentence consisting of a combination of a noun included in the text and a predicate on which the noun depends. The text matching method includes: the step of storing texts of the first category and the second category distinguished from each other; text pair generating step of generating a text pair consisting of a text of the first category and a text of the second category; features-for-matching generating step of generating, from the pair, features-for-matching, including the features used when the text in the pair generated by the text pair generating means is classified by the text classifying device; and matching step of determining, using the features-for-matching generated at the features-for-matching generating step, whether or not two texts forming the pair match each other. The matching step includes the step of determining, using a machine learning model pre-trained using training data for matching in advance to determine whether a pair of texts matches based on the features-for-matching, whether or not the two texts forming the pair match each other.

According to a still further aspect, the present invention provides a text classifying method of classifying a text to a specific category related to problem report or solution. The method includes: morpheme analyzing step of performing morphological analysis of the text and outputting a sequence of morphemes with a piece of part-of-speech information; dependency analyzing step of analyzing dependency between morphemes of the sequence of morphemes output at the morpheme analyzing step, and outputting a piece of dependency information representing dependency relation of the text; and classifying step of specifying, based on the sequence of morphemes and the dependency relation of text, a core of a sentence consisting of a noun included in the text and a predicate on which the noun depends, and classifying the text to the specific category or to another category, using a combination of classification of the noun in the core and classification of the predicate.

BRIEF DESCRIPTION OF DRAWINGS

FIG. 5 shows an example of an output screen of a problem/request/support information matching system.

DESCRIPTION OF EMBODIMENTS

Figure 1:
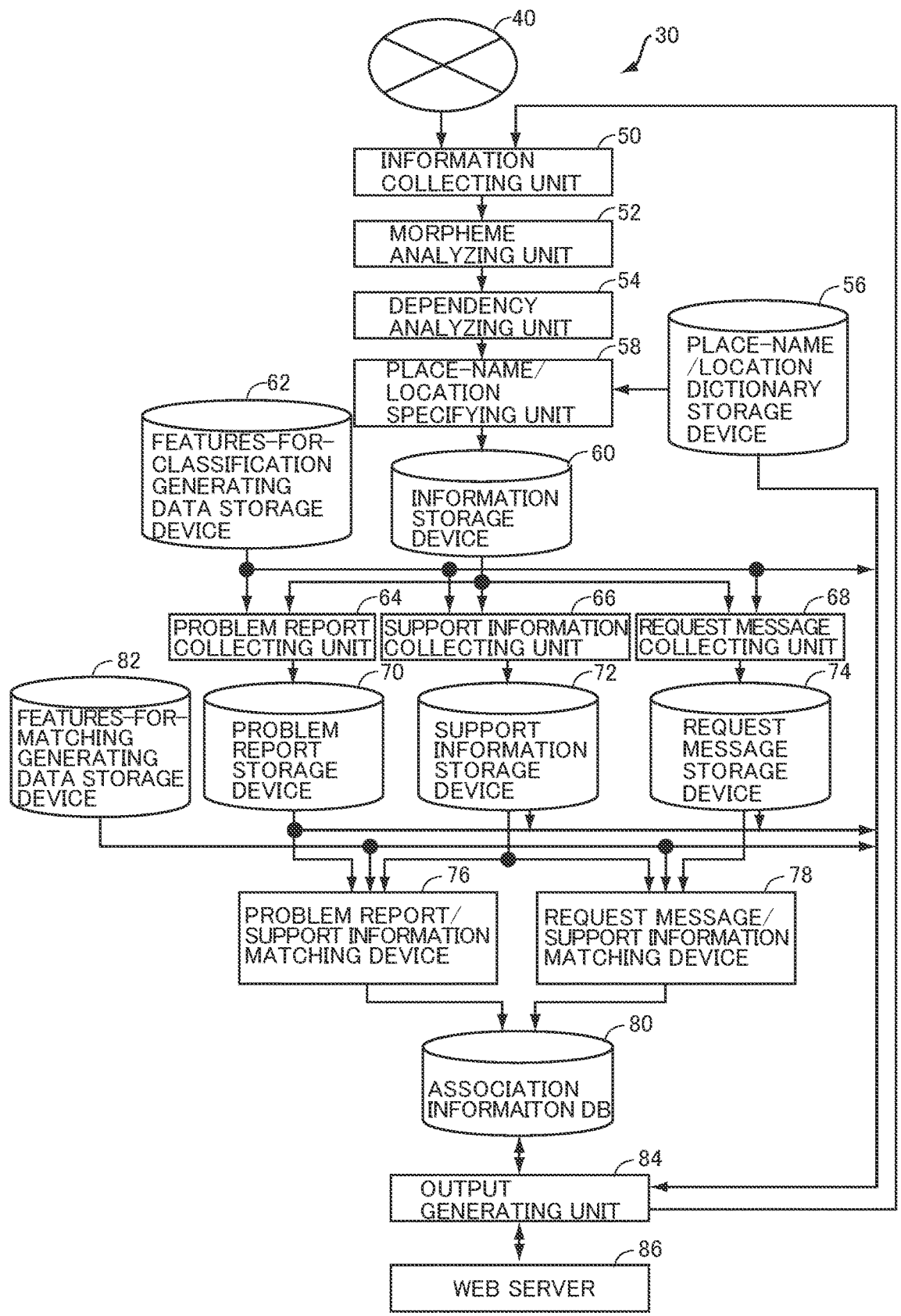
FIG. 1 is a block diagram of a problem report/support information matching system in accordance with an embodiment of the present invention.

In the following description of embodiments and in the drawings, the same components are denoted by the same reference characters. Their names and functions are also the same. Therefore, detailed description thereof will not be repeated.

[Basic Concept]

First, a core-based matrix method (Table 1) for specifying/collecting texts belonging to three categories of problem report, request message and support information will be described, and then, its functions and effects will be discussed. Next, a co-occurrence pair matrix method (Table 2) developed for matching between problem report and support information and matching between request message and support information will be described, and then its functions and effects will be discussed. In the following, texts belonging to the category of problem report, texts belonging to the category of request message and texts belonging to the category of support information may also be referred to as problem report, request message and support information, respectively.

<Core Based Matrix Method>

TABLE 1

|  | Core-based Template | |
| --- | --- | --- |
|  | Trouble expression | Non-trouble expression |
| Excitatory template | Problem core (1) | Support core (1) (Request core (1)) |
| Inhibitory template | Support core (2) (Request core (2)) | Problem core (2) |

In the present embodiment, a new method referred to as core-based matrix method is used for specifying/collecting the problem reports, the request messages and the support information. Referring to Table 1, this method divides dependency relation between a noun and a predicate expressed in a text, in accordance with a combination between classification of the noun and polarity of the predicate. Here, the noun is classified to a trouble expression or non-trouble expression, and the polarity of predicate is classified to excitatory or inhibitory. Depending on the polarity, each predicate is classified to an excitatory template or an inhibitory template.

The trouble expression refers to a noun representing a problem or a burden. Examples include "accident," "influenza," "error," "sludge," "influenza" and "atopy." The non-trouble expression refers to an expression that does not generally represent any trouble or burden, such as "bath," "medicine," "food" and so on.

The excitatory template is an expression containing a variable X, consisting of a combination of a particle and a predicate indicating that a function or the like of the subject indicated by the variable X turns "on" (the function or the like is activated). Examples may include "X wo hikiokosu (X を引き起こす, cause X)," "X wo tukau (X を使う, use X)," "X wo kau (X を買う, buy X)," "X wo sinkou saseru (X を進行させ, る, promote X)," "X wo yunyu suru (X を輸入する, import X)" and "X ga fueru (X が, 増える, X increases)." These are expressions indicating that the function of an item represented by X is exhibited.

The inhibitory template is an expression containing a variable X, indicating that a function or the like of the subject indicated by the variable X turns "off" (the function or the like is inactivated). Examples may include "X wo fusegu (X を防ぐ, prevent X)," "X wo suteru (X を捨てる, dispose X)," "X ga heru (X が減る, X decreases)," "X wo hakai suru (X を破壊する, destroy X)," and "X ga fukanou ni naru (X Xが不可 能になる, X becomes impossible)."

In the present specification, "excitatory" and "inhibitory" are generally referred to as "polarity."

As described above, according to the core-based matrix method, the noun and the predicate are each divided to two, resulting in four different classifications. The dependency relations divided to these four classifications are the following four types.

(A) Problem Core (1)

The problem core (1) refers to the combination of noun+predicate including a dependency relation in which the noun=trouble expression and the predicate=excitatory template. An example is "hedoro ga chikuseki suru (ヘドロが蓄積する, sludge builds up)" (sludge=trouble expression, X builds up=excitatory template). The dependency relation corresponding to problem core (1) indicates that the function of a problem or burden indicated by the trouble expression turns on, and it tends to indicate that a problem exists or has an influence.

(B) Problem Core (2)

The problem core (2) refers to the dependency relation in which the noun is a non-trouble expression and the predicate is an inhibitory template. An example is "ofuro ni komaru (お風呂に困る, have difficulty taking bath)" (bath=non-trouble expression, have difficulty=inhibitory template). Many people could not take bath because of water failure or electric outage at the time of a disaster, and this was a problem. The expression here is highly expected in such a situation. The dependency relation corresponding to problem core (2) indicates that the function of an event indicated by the non-trouble expression turns off, and it tends to indicate that countermeasures or assisting activities are not well functioning.

(C) Support Core (1)

The support core (1) refers to the dependency relation in which the noun is a trouble expression and the predicate is an inhibitory template. An example is "hedoro wo jokyo suru (ヘドロを除去する, remove sludge)" (sludge=trouble expression, remove X=inhibitory template). The dependency relation corresponding to support core (1) indicates that the function of a trouble or burden indicated by the trouble expression turns off, and it tends to indicate that the problem is solved or alleviated.

(D) Support Core (2)

The support core (2) refers to the dependency relation in which the noun is a non-trouble expression and the predicate is an excitatory template. An example is "ofuro wo kaihou suru (お風呂を開放する, open bath)" (bath=non-trouble expression, open X=excitatory template). The dependency relation corresponding to support core (2) indicates that the function of an event indicated by the non-trouble expression turns on, and it tends to indicate that countermeasures or assisting activities are executed or prepared.

In the present embodiment, a support core having a request marker added thereto is referred to as a request core. Request markers similar to those used in the prior art for collecting request items are used. The request core is classified to following two types.

(E) Request Core (1)

The request core (1) refers to the support core (1) with a request marker added. An example is "hedoro wo katadukete kudasai, (ヘドロを片付けてください, Please clear away the sludge)" (sludge=trouble expression, remove X=inhibitory template, please=request marker). The dependency relation corresponding to this type requests turning off of the function of the trouble or burden indicated by the trouble expression, and it tends to represent a request for solution or alleviation of the problem.

(F) Request Core (2)

The request core (2) refers to the support core (2) with a request marker added. An example is "ofuro wo teikyou shite hoshii (お風呂を提供してほしい, please offer bath)" (bath=non-trouble expression, offer X=excitatory template, please=request marker). The dependency relation corresponding to this type requests turning on of the event indicated by the non-trouble expression, and it tends to represent a request for execution or preparation of countermeasures or assisting activities.

In the present embodiment, performance of specifying and collecting problem reports/request messages/support information is improved, using these six types of cores. More specifically, information about which of these types a core of a sentence (noun+predicate) belongs to is used as the feature for training a classifier classifying various messages on the Internet. Specific description will be given below.

<Functions and Effects of Problem Core>

A problem report tends to include any of the two problem cores. For example, a problem report "I've heard that powder formula for allergic babies runs short in such-and-such City" includes an expression corresponding to problem core (1). Therefore, whether or not there is a problem core in a text is used as a feature for the classifier. It was found by an experiment, which will be described later, that the performance of specifying/collecting problem reports was improved when this feature was used than when it was not used.

<Functions and Effects of Support Core>

Support information tends to include any of the two support cores. For example, support information "powder formula for allergic babies will be distributed at such-and-such City hall" includes an expression corresponding to the support core "distribute powder formula" (powder formula=non-trouble, distribute X=excitatory template). Therefore, in the present embodiment, whether or not there is a support core in a text is used as a feature for the classifier. It was found by the experiment that the performance of specifying/collecting support information was improved when this feature was used than when it was not used.

<Functions and Effects of Request Core>

A request message tends to include any of the two request cores. For example, a request message "please send powder formula for allergic babies to such-and-such City" includes an expression corresponding to the request core (2) "please send powder formula" (powder formula=non-trouble, send X=excitatory template, please=request marker). Therefore, in the present embodiment, whether or not there is a request core in a text is used as a feature for the classifier. It was found by the experiment that the performance of specifying/collecting request message was improved when this feature was used than when it was not used.

<Co-Occurrence Pair Matrix Method>

In the present embodiment, a new method referred to as "co-occurrence pair matrix method" is used for matching between problem report and support information and matching between request message and support information. This method is applicable, for example, when a problem core included in a problem report and a support core included in a piece of support information share the same noun, to the pair formed by the problem report and the piece of support information. The same is true for a pair formed by a request message and a piece of support information. In this method, types of these pairs are divided according to classification of cores included therein and polarities of predicates. Table 2 below shows matrixes of classification in accordance with the core types and the polarities of predicates included in the cores using the co-occurrence pair matrix method.

TABLE 2

|  | Problem core/request core | Support core |
| --- | --- | --- |
| Opposite polarities | Problem core (1) trouble + excitatory template | Support core (1) trouble + inhibitory template |
|  | Problem core (2) non trouble + inhibitory template | Support core (2) non-trouble + excitatory template |
| Same polarities | Request core (1) trouble + inhibitory template + request marker | Support core (1) trouble + inhibitory template |
|  | Request core (2) non trouble + excitatory template + request marker | Support core (2) non-trouble + excitatory template |

The pairs divided by the co-occurrence pair matrix method are of the following two types.

(1) Problem Core—Support Core Pair

This is a pair in which the core types are problem core and support core and predicate polarities of the problem core and the support core are opposite. Specifically, the pair of problem core (1) and support core (1), or the pair of problem core (2) and support core (2) is of this type. Cores having different relations do not form this pair. Examples of problem core—support core forming the pairs are as shown in Table. 3 below. It is on the premise that the cores share the same noun.

TABLE 3

"hedoro ga chikuseki suru (ヘドロが蓄積する, sludge builds up)"
<-> hedoro wo jokyo suru (ヘドロを除去する, remove sludge)"
(X builds up = excitatory template, remove X = inhibitory template)
"ofuro ni komaru (お風呂に困る, have difficulty taking bath)"
<->ofuro wo kaihou suru (お風呂を開放する, open bath)"
(have difficulty in X = inhibitory template, open X = excitatory template)

(2) Request Core—Support Core Pair

This is a pair in which the core types are request core and support core and predicate polarities of the request core and the support core are the same. Specifically, the pair of request core (1) and support core (1), or the pair of request core (2) and support core (2) is of this type. Cores having different relations do not form this pair. Examples of request core—support core forming the pairs are as shown in Table. 4 below. Here again, it is on the premise that the cores share the same noun.

TABLE 4

"hedoro wo katadukete kudasai (ヘドロを片付けてください, Please clear away the sludge)
<-> hedoro wo jokyosuru (ヘドロを除去する, remove sludge)"
"ofuro wo teikyou shite hoshii (お風呂を提供してください, please offer bath)
<-> ofuro wo kaihou suru (お風呂を開放する, open bath)"
(offer X = excitatory template, open X = excitatory template)

The pairs of problem core and support core and request core and support core are each classified to either of the two types described above. By using the classification as a feature, it becomes possible to improve accuracy of matching between problem report and support information and matching between request message and support information.

<Function and Effects of Problem Core—Support Core Pair>

When an appropriate match is found between a problem report and a piece of support information, the combination of these pieces of information tends to include a problem core—support core pair. By way of example, a problem report "I've heard that powder formula for allergic babies runs short in such-and-such City" and a piece of support information "powder formula for allergic babies will be distributed at such-and-such City hall" can be considered to be an appropriate matching, since the problem of the former can be solved by the support information of the latter, or the information of the latter contributes to solution of the problem of the former. This pair includes expressions corresponding to a problem core—support core pair of "powder formula runs short <-> power formula will be delivered." Therefore, in the present embodiment, whether or not there is a problem core—support core pair in pairs of problem report and support information is used as a feature of the classifier. As will be described later, it was found by the experiment that the performance of finding appropriate matching of problem report—support information pair was improved when this feature was used than when it was not used.

<Functions and Effects of Request Core—Support Core Pair>

When an appropriate match is found between a request message and a piece of support information, the combination of these pieces of information tends to include a request core—support core pair. By way of example, a request message such as "please send powder formula for allergic babies to such-and-such City" and a piece of support information "powder formula for allergic babies will be distributed at such-and-such City hall" can be considered to be an appropriate matching, since the request of the former can be met by the support information of the latter, or the information of the latter contributes to solution of the problem of the former. This pair includes expressions corresponding to a request core—support core pair of "please send powder formula <-> power formula will be delivered." Therefore, in the embodiment described in the following, whether or not there is a request core—support core pair in pairs of problem report and support information is used as a feature of the classifier. As will be described later, it was found by the experiment that the performance of finding appropriate matching of request message—support information pair was improved when this feature was used than when it was not used.

[System Configuration]

Referring to FIG. 1, a matching system 30 in accordance with the present embodiment includes: an information collecting unit 50 collecting various pieces of information including problem reports, request messages and support information (hereinafter these will be referred to as "messages") and formatting these pieces of information to forms appropriate for subsequent information processing; a morpheme analyzing unit 52 for performing morphological analysis on the messages collected and formatted by information collecting unit 50 and outputting results in a form of a morpheme sequence having information of part of speech and the like; a dependency analyzing unit 54 adding dependency relation between morphemes to messages and outputting results; a place-name/location specifying unit 58 specifying a place-name or a location as a source of each message having the dependency relation added by dependency analyzing unit 54 and adding it to each message; and a place-name/location dictionary storage device 56 storing a place-name/location dictionary used for specifying the source of each message by place-name/location specifying unit 58. A message such as a tweet from Twitter may have longitude/latitude information of the place of dispatch rather than a place name. Place-name/location specifying unit 58 also has a function of specifying a place-name/location from such longitude/latitude information.

Information matching system 30 further includes: information storage device 60 storing messages collected by information collecting unit 50 and processed by morpheme analyzing unit 52, dependency analyzing unit 54 and place-name/location specifying unit 58; and a storage device 62 storing information (data for generating features-for-classification) necessary for calculating a plurality of different features used for determination by a machine learning model, for classifying information as the object of processing.

Information matching system 30 further includes: a problem report collecting unit 64, using data stored in storage device 62, for calculating features of each of the messages stored in information storage device 60, classifying messages to texts belonging to a category of problem report and other texts using a machine learning model trained using the same features, and thereby collecting texts of problem reports; a problem report storage device 70 storing problem reports collected by problem report collecting unit 64; a support information collecting device 66, using data stored in storage device 62, for calculating features of each of the messages stored in information storage device 60, classifying messages to texts belonging to a category of support information and other texts using a machine learning model trained using training data, and thereby collecting support information; a support information storage device 72 storing support information collected by support information collecting device 66; a request message collecting device 68, using data stored in storage device 62, for calculating features of each of the messages stored in information storage device 60, classifying messages to texts belonging to a category of request message and other texts using a trained machine learning model, and thereby collecting request messages; and a request message storage device 74 storing request messages collected by request message collecting device 68. Problem report collecting unit 64, support information collecting device 66 and request message collecting device 68 are devices suitably used for classifying texts in advance, in preparation for information matching by information matching system 30. These devices use the same features as the features for machine learning model for classification. The same features are also used at the time of learning and at the time of actual classification process. It is noted, however, that at the time of learning, training data is added manually.

In the present embodiment, problem report collecting unit 64, support information collecting device 66 and request message collecting device 68 are realized by machine learning using data stored in storage device 62.

The features for machine learning includes: a core type determined from classification of a noun (trouble/non-trouble) in a core (problem core/support core/request core) in a message and polarity of predicate of the core (excitatory/inhibitory), in accordance with the core-based matrix; an evaluation expression, an evaluation type and an evaluation polarity in the message obtained by using an evaluation expression dictionary, not shown; semantic class of the noun in the core; and n-grams including the noun in the core in the dependency relation of message. As will be described later, by the n-grams, time information included in the message, regional information related to the message, and modality of the message come to be included in the features-for-matching.

Modality of a message refers to subjective semantic contents related to a manner of description of the message. By way of example, consider the following three contexts (A) to (C) as pairs containing "there is no water" and "water delivered." Modality is used for distinguishing (A) from (B) and (C).

(A) "mizu ga nai (水が無い, there is no water)" "mizu ga todoku yotei desu (水が届く予定です, water will be delivered)"

(B) "mizu ga nai (水が無い, there is no water)" "水が届くというのはデマ, mizu ga todokuto iunoha dema (it is false rumor that water will be delivered)"

(C) "mizu ga nai (水が無い, there is no water)" "mizu ga todoku kotowo yosou shitemasu (水が届くことを予想してます, I expect water will be delivered)"

Modality classification may be done from various points of view. Briefly, there are two modalities: one that represents how the writer thinks about the contents of a message, and the other that represents attitude to the reader. The former can further be divided to a modality of true/false determination and a modality of value determination. These can be determined using an expression (modality element) associated with the predicate in the message as a key. By way of example, modalities of true/false determination include assertion, estimation, determination, hearsay and explanation. In the examples above, "rumor" and "expect" indicate that these sentences belong to a class of estimation or hearsay, which are inappropriate as objects for matching in the intended use of the present embodiment. On the other hand, the example (A), in which the predicate of a sentence finishes with an end form of a verb, states a fact and, therefore, it is suitable as an object of matching. A word used for determining the modality is often placed at a position associated with a core, with the core being at the center of a message. Therefore, by using the n-gram including a noun in the core in message dependency relation, message matching considering modality of message becomes possible.

The same applies to the time information and regional information in the message.

The information stored in storage device 62 includes: a trouble expression dictionary, not shown, storing classifications of nouns (trouble/non-trouble), for forming the core-based matrix mentioned above related to messages; a polarity dictionary, not shown, storing polarity (excitatory/inhibitory) of the predicates; an evaluation expression dictionary used for specifying an evaluation expression included in a message; a request expression dictionary, not shown, used for determining whether or not a message includes any request expression; and a semantic class dictionary of nouns for specifying semantic class each noun belongs to.

The evaluation expression dictionary is for determining whether or not any evaluation of something is included in the message. Determination of evaluation expression is a process for determining, using machine learning, in a text file as an input, whether or not any comment, criticism or evaluation (hereinafter these will be generally referred to as "evaluation information") related to any event exists in each text. If it is found that evaluation information exists in a sentence, an expression representing the evaluation information is extracted (extraction of evaluation expression), the evaluation information is semantically classified (evaluation type classification), and whether the evaluation information implies positive nuance (positive) or negative nuance (negative) is determined (evaluation polarity determination).

The trouble expression dictionary is for determining whether the core noun represents a trouble or not, and it contains nouns related to diseases, disasters, accidents and the like.

The polarity dictionary is for determining whether a combination of a particle and a predicate included in the core is excitatory, inhibitory or other. This dictionary contains various predicate expressions and information obtained by manually determining whether each predicate has excitatory or inhibitory polarity.

The request expression dictionary is for determining whether or not a predicate included in a message or in a core includes a request marker, and it contains manually collected request markers.

The semantic class dictionary contains words manually classified to classes having similar meanings (semantic classes). By way of example, "influenza" and "atopic dermatitis" are registered as belonging to the same semantic class.

Information matching system 30 further includes: a problem report/support information matching device 76, forming a pair by taking out one piece of information from problem reports stored in problem report storage device 70 and one piece of information from support information stored in support information storage device 72, respectively, matching information in the pair using a trained machine learning model, and outputting information (match information) associating matched problem report and support information. Problem report/support information matching device 76 conducts matching using a set of prescribed features including features obtained from the problem reports and the support information based on the co-occurrence pair matrix method.

Information matching system 30 further includes: a request message/support information matching device 78, forming a pair by taking out one piece of information from support information stored in support information storage device 72 and one piece of information from request message storage device 74, respectively, matching information in the pair using a trained machine learning model, and outputting match information associating matched support information and request message. Request message/support information matching device 78 also conducts matching using a set of prescribed features including features obtained from the request messages and the support information based on the co-occurrence pair matrix method.

Information matching system 30 further includes: an association information DB 80 storing match information output from problem report/support information matching device 76 and request message/support information matching device 78; and a storage device 82 storing data (features-for-matching generating data) for generating features-for-matching, used during matching by problem report/support information matching device 76 and request message/support information matching device 78. Association information DB 80 is a database allowing calling of any piece of match information using an identifier of each piece of information, calling a piece of match information including a message having a specific keyword and calling a piece of match information including any message using, as a key, a place related to a certain place-name.

Problem report/support information matching device 76 and request message/support information matching device 78 have similar configurations, and in the present embodiment, these devices both use SVM (Support Vector Machine) as an example of machine learning technique. It is noted, however, that data used for SVM learning are different.

Information matching system 30 further includes: a web server 86 connected to the Internet; and an output generating unit 84 realized by a program for information search using association information DB 80. In response to an inquiry received through web server 86, output generating unit 84 classifies a message included in the inquiry to a problem report, support information or a request message and stores it using various units of information matching system 30 described above. Output generating unit 84 also matches between a message included in the inquiry and existing problem reports, support information and request messages and stores the result of matching in association information DB 80. Output generating unit 84 further reads a piece of match information including a message included in the inquiry and satisfying a search condition included in the inquiry from association information DB 80 and transmits a formatted output data to a counterpart through web server 86.

Once association information DB 80 is created, it becomes possible to extract matching problem report and support information or request message and support information from the information in association information DB 80 and to display the result on a terminal or to provide the result as data to another device. Such a process is done by a program executed by output generating unit 84. Here, as an example, when a message including a problem report, a request message or a piece of support information is input from another terminal through web server 86, output generating unit 84 realizes a process of returning a message matching the input message. As will be described later, in matching by output generating unit 84, even geographical information related to a position where the message is issued can be used as an element for matching.

Needless to say, information matching system 30 is realized by computer hardware having a communication function, a computer program executed by the hardware, and data necessary for generating output when the computer program is executed. Of these, information collecting unit 50, morpheme analyzing unit 52, dependency analyzing unit 54 and place-name/location specifying unit 58 can easily be implemented by conventional technique. Therefore, the process of collecting problem reports, support information and request messages from messages collected from the Internet 40, the process of matching these pieces of information and generating and storing match information, and the process of generating useful information using the match information will be discussed in the following.

Figure 2:
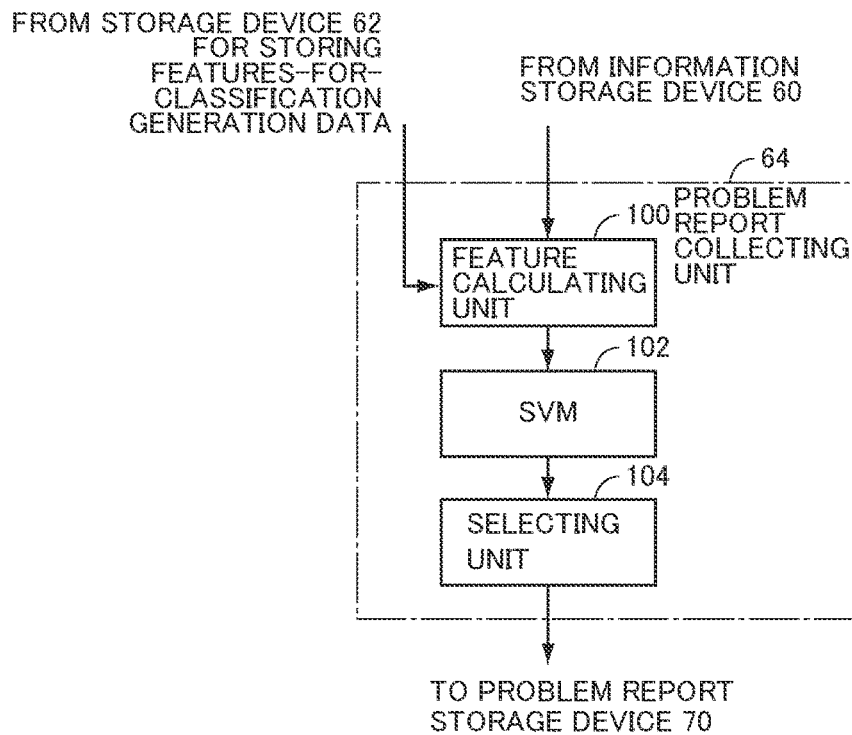
FIG. 2 is a block diagram schematically showing a configuration of a problem report collecting device shown in FIG. 1.

FIG. 2 shows, in the form of a block diagram, a configuration of problem report collecting unit 64 shown in FIG. 1. Support information collecting device 66 and request message collecting device 68 shown in FIG. 1 also have the same configurations. Therefore, in the following, description will be given mainly focusing on the configuration of problem report collecting unit 64.

Referring to FIG. 2, problem report collecting unit 64 includes: a feature calculating unit 100 reading a new message from information storage device 60 and calculating a prescribed feature using data stored in storage device 62, based on dependency information, morpheme sequence and the like of the input message; an SVM 102 already trained with training data with respect to the feature calculated by feature calculating unit 100, outputting a result of determination based on the input feature vector, as to whether the message is a problem report or not, with a corresponding score; and a selecting unit 104 selecting a message determined by SVM 102 to be a problem report and storing it with the SVM score, in problem report storage device 70. SVM 102 has been trained using training data consisting of the above-described set of features obtained from a number of messages and flags (correct answer data) indicating whether or not each message is a problem report or not. The present embodiment is characterized in that the feature obtained from the idea of core-based matrix as described above (noun classification and predicate polarity) is used.

Support information collecting device 66 and request message collecting device 68 have the same configuration as problem report collecting unit 64. These devices, however, are different from problem report collecting unit 64 in that in support information collecting device 66, SVM 102 is trained using training data having a flag indicating whether or not each message is support information or not, and that in request message collecting device 68, SVM 102 is trained using training data having a flag indicating whether or not each message is a request message.

Figure 3:
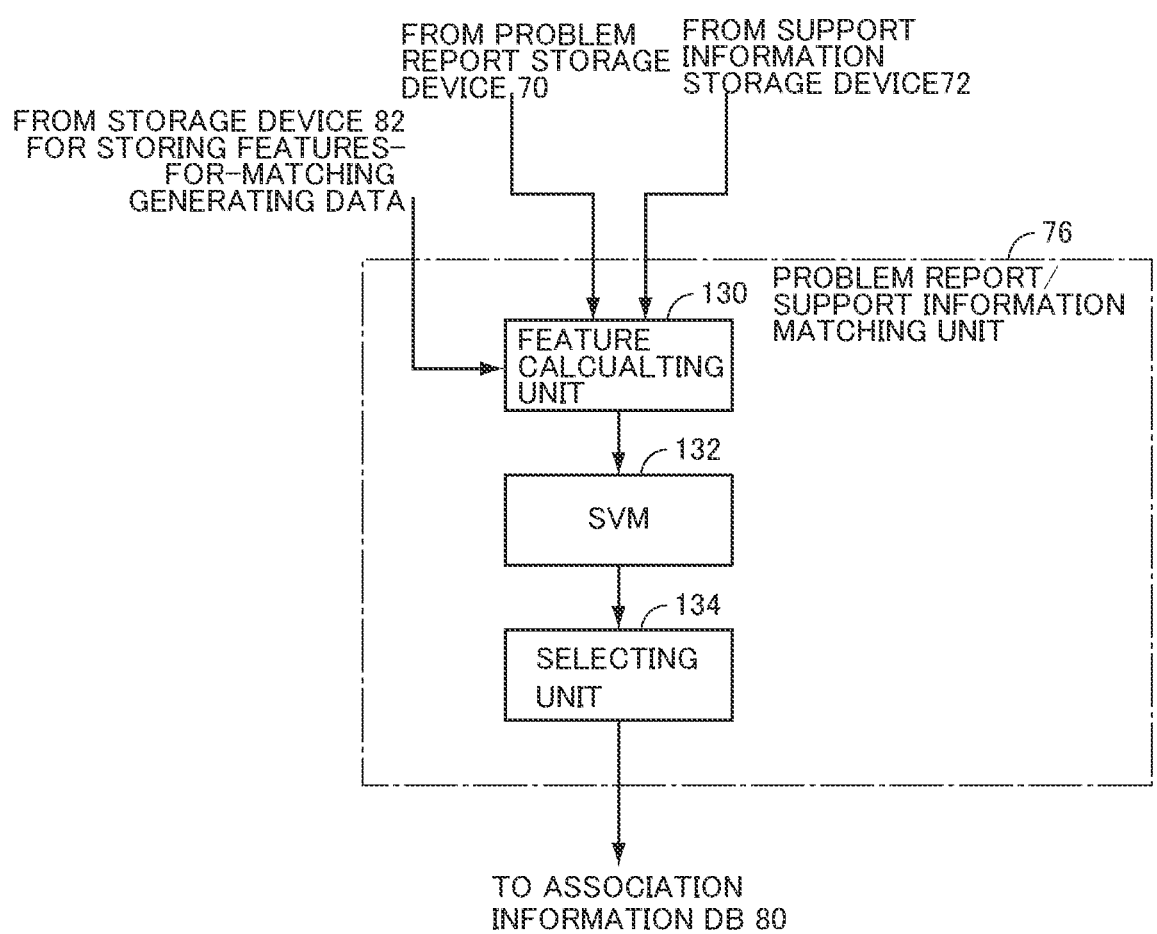
FIG. 3 is a block diagram schematically showing a configuration of a problem report/support information matching device shown in FIG. 1.

FIG. 3 is a schematic block diagram of problem report/support information matching device 76 shown in FIG. 1. Request message/support information matching device 78 basically has the same configuration as problem report/support information matching device 76. Therefore, in the following, only the configuration of problem report/support information matching device 76 will be described.

Referring to FIG. 3, problem report/support information matching device 76 includes: a feature calculating unit 130 reading messages one by one from both of problem report storage device 70 and support information storage device 72, calculating a prescribed feature from the set of these two messages using data stored in storage device 82 and outputting the result as a feature vector; an SVM 132 learned in advance to output whether or not a problem report as an object of processing matches support information, based on the feature vector output from feature calculating unit 130; and a selecting unit 134 selecting, based on the output from SVM 132, only the matching sets of problem reports and support information processed by feature calculating unit 130 and storing them in association information DB 80. The feature calculated by feature calculating unit 130 is the feature based on the co-occurrence pair matrix method described above. It includes presence/absence of a common word in the nouns forming "noun+predicate" and presence/absence of a common semantic class, and it further includes the score provided at the time of determination by SVM 102 (see FIG. 2) of problem report collecting unit 64.

SVM 132 is similarly trained using the same feature as that calculated by feature calculating unit 130, by the training data including the problem reports and the support information determined in advance as matching. When a problem report and a piece of support information are given, SVM 132 provides an output of whether these match or not.

The configuration of request message/support information matching device 78 is the same as that of problem report/support information matching device 76. It is different from problem report/support information matching device 76, however, in that the training data for learning of SVM 132 is related to the combination of request message and support information.

Output generating unit 84 in accordance with the present embodiment has a function of outputting, for a message input by a user, a piece of information matching the message. Here, we assume that messages including any of problem report, support information and request message such as "powder formula for allergic babies runs short in such-and-such City" and "powder formula for allergic babies will be distributed at such-and-such City hall" are typically input. Output generating unit 84 searches, in accordance with which of these types the input message is, pieces of information matching the input message from association information DB 80 and displays the results in the form of a list. In the following, a program realizing output generating unit 84 and an example of an input/output screen image will be described.

Figure 4:
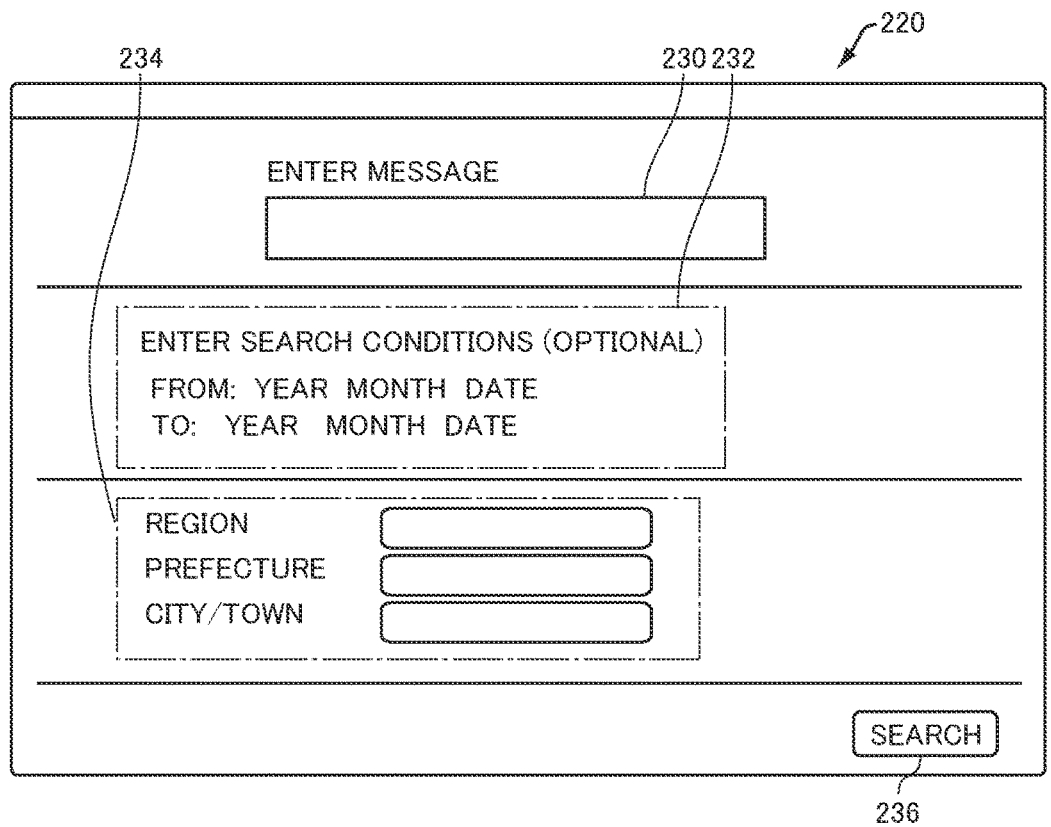
FIG. 4 is a schematic diagram showing an example of an input screen of a problem/request/support information matching system using matching information.

Referring to FIG. 4, an input screen 220 displayed when a user accesses output generating unit 84 from a remote terminal through a web browser includes: a message input field 230; an input panel 232 for entering search-related date information; an input panel 234 for entering geographical condition; and a search button 236 as a trigger for transmitting a search request to information matching system 30. Panels 232 and 234 for entering date information and geographical condition are used for further refinement, with specific conditions, the information matching the message input field 230. Here, the search is refined by using date and geographical information. Other information (for example, a keyword, name of a sender, time of transmission, or whether the message is still pending) may be used as a condition for refinement.

FIG. 5 shows an example of a screen returned from information matching system 30 after a message is input through the screen of FIG. 4 and transmitted to information matching system 30. Here, screen 250 includes: an input display area 260 displaying for confirmation the message input by the user; a matching information display panel 262 displaying information matching the input message; a map panel displaying, in the form of a pin or pins 266, places where the message or messages displayed on matching information display panel are dispatched, or related positions on a map; a search condition display panel 268 displaying for confirmation of search condition or conditions input by the user; and a re-search button 270 operated by the user when he/she tries his/her search again with different conditions. When button 270 is clicked, the input screen 220 shown in FIG. 4 is displayed.

Figure 6:
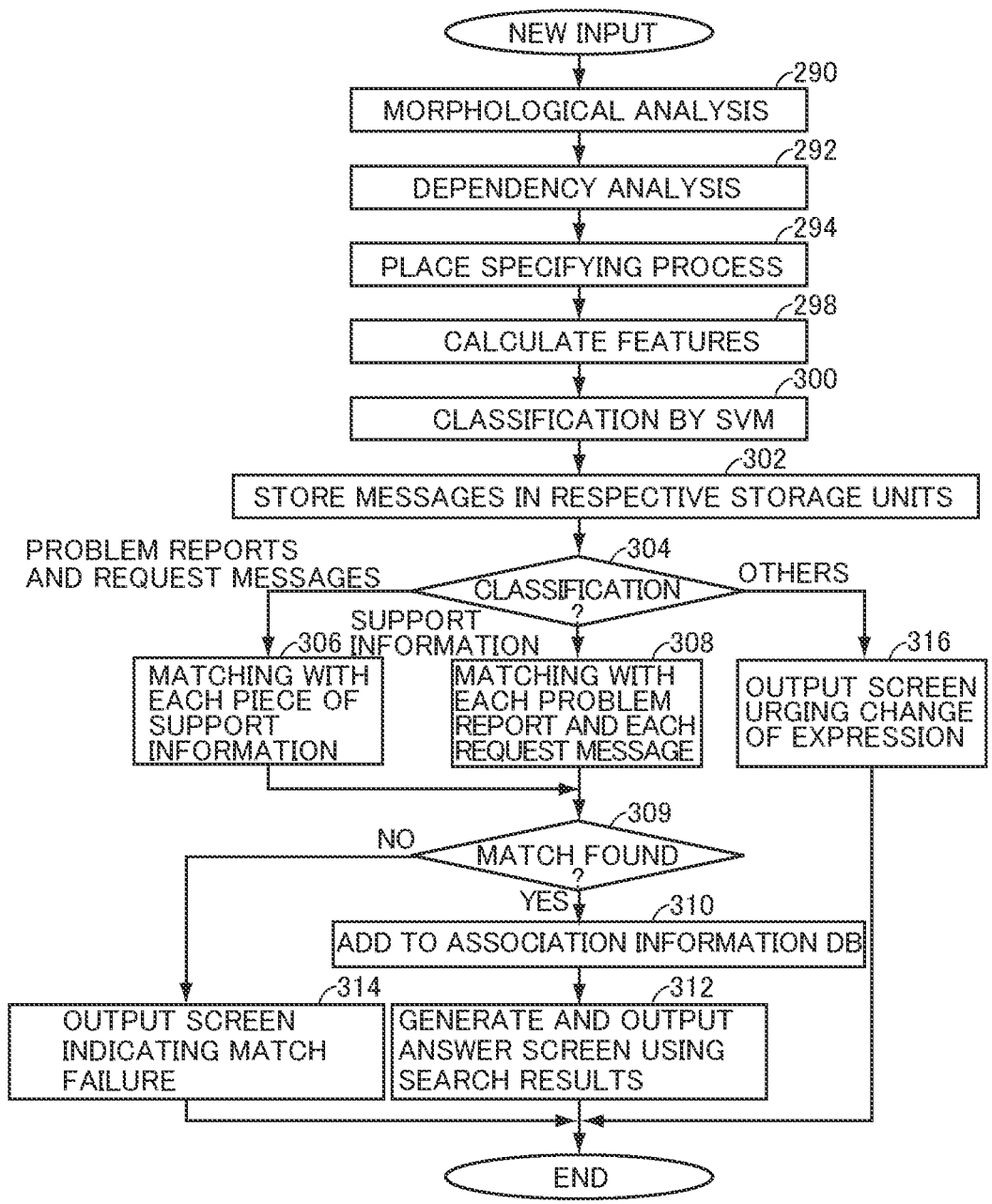
FIG. 6 is a flowchart representing a control structure of an example of a program for searching a piece of information matching with an input, in the problem/request/support information matching system.

FIG. 6 shows, as an example of a program realizing output generating unit 84, a control structure of a program for returning, to a user terminal, information matching the message input by the user using the screen shown in FIGS. 4 and 5. Output generating unit 84 may be realized in the form of various other web applications using association information DB 80.

Referring to FIG. 6, the program is activated when web server 86 receives a search request from a user and passes it to output generating unit 84. The message input by the user, the search condition related to date, and geographical search condition are passed to the program as arguments. A piece of GPS information of the terminal that issued the request may be added to the geographical information and passed to the program. In this example, it is assumed that such GPS information is passed as an argument to output generating unit 84.

First, the message is subjected to morphological analysis (S290), and a sequence of morphemes is output. The sequence of morphemes is subjected to dependency analysis (step 292), and based on the geographical information added to the message or on the GPS information, the place from where the message was issued is specified (step 294) using place-name/location dictionary storage device 56 shown in FIG. 1 and added to the message, and the message is added to information storage device 60 of FIG. 1. These process steps are executed by morpheme analyzing unit 52, dependency analyzing unit 54 and place-name/location specifying unit 58 shown in FIG. 1.

Thereafter, at step 298, from the input message, a set of message features is calculated in accordance with the information stored in storage device 62 and a prescribed method of feature calculation, and thereby a feature vector is formed. At following step 300, by SVM 102 (see FIG. 2) of each of problem report collecting unit 64, support information collecting device 66 and request message collecting device 68 shown in FIG. 1, whether or not the message that is being processed belongs to any of the problem report, support information and request message is determined. If the message is a problem report, it is stored in problem report storing device 70, if it is support information, it is stored in support information storage device 72, and if it is a request message, it is stored in request message storage device 74, respectively (step 302).

The input message is classified to any of the problem report, support information and request message and stored accordingly as described above, in order to add the message as an object of matching with a message input later.

Thereafter, the result of classification is determined (step 304). If the input message is a problem report or a request message, matching of this message with the support information is done at step 306; if the message is support information, matching of this message with problem reports and request messages is done at step 308. Thereafter, whether or not any information matching the message has been found as a result of matching at steps 306 or 308 is determined (step 309). If there is any information matching the message, the matched information and the message are associated with each other and added to association information DB 80 (step 310).

Thereafter, based on the match information added to association information DB, an HTML document corresponding to the screen 250 shown in FIG. 5 is generated at step 312, and it is returned to the terminal that has sent the original message, and thus, the process for the input message is completed.

If the determination at step 309 is negative, that is, if there is no information matching the input message found at steps 306 and 308, the control proceeds to step 314. At step 314, a screen indicating that there is no information matching the message is output, and the process ends. On this screen, a text such as "No information matching the message was found. Do you want a notification if a matching information is found?" is displayed on screen 250, and a button or the like for selecting whether or not to receive a notification is displayed, and further, a field, button or the like for entering information (such as a mail address) necessary for the notification are displayed. If the user selects to receive the notification, a process of searching matching information including the message in association information DB 80 becomes necessary, and if any matching information is found, a process of transmitting the information to the recorded mail address becomes necessary. This process of transmitting information, however, is not related to the main portion of the present invention and, therefore, details thereof will not be described here.

If it is determined at step 304 that the input message is none of the problem reports, the support information and the request messages, the control proceeds to step 316. Here, it may be the case that the input message was inappropriate. Therefore, at step 316, a message urging the user to try again by inputting the message with conditions or expressions of the previous message modified, is displayed on screen 250, and the process ends. When the user presses re-search button 270, input screen 220 shown in FIG. 4 is displayed. The user can execute the search again, with the search conditions such as the expression of message, date, place and so on changed.

[System Operation]

Information matching system 30 described above operates in the following manner. Referring to FIG. 1, it is assumed that learning of the SVMs of problem report collecting unit 64, support information collecting device 66, request message collecting device 68, problem report/support information matching device 76 and request message/support information matching device 78 shown in FIG. 1 has been completed in advance with appropriate training data.

Information collecting unit 50 of information matching system 30 at first collects various pieces of information on the Internet 40 and applies the information to morpheme analyzing unit 52. Here, pieces of information issued on such a system that transmit problem reports, request messages and support information in relatively short sentences, for example, Twitter, are mainly collected. Morpheme analyzing unit 52 conducts morphological analysis, and then, dependency analyzing unit 54 conducts dependency analysis and adds dependency information of each sentence to each piece of information. To these pieces of information, place-name/location specifying unit 58 further adds information related to the related region or the region of dispatch. Finally, these pieces of information are stored in information storage device 60. The pieces of information collected by information collecting unit 50 typically has the date and time when the information was issued added thereto.

Feature calculating unit 100 (see FIG. 2) of problem report collecting unit 64 reads information from information storage device 60, extracts features for determining a problem report from the information using the feature generating data stored in storage device 62, and forms a feature vector. Of these features, the feature representing classification (trouble/non-trouble) related to the noun in the noun+predicate of the information and the feature representing polarity (excitatory/inhibitory) of the predicate are included, as described above.

SVM 102 receives the feature vector, determines whether or not the information corresponding to the feature vector is a problem report or not, and outputs the result of determination. If the determination is positive (the information is a problem report), selecting unit 104 adds this piece of information to problem report storage device 70. If the determination is negative, it does not do anything on this piece of information, and problem report collecting unit 64 proceeds to processing of the next piece of information.

Support information collecting device 66 and request message collecting device 68 operate in the similar manner as problem report collecting unit 64. Since SVMs of these devices are trained with training data different from that for problem report collecting unit 64, these devices determine whether the input information is support information or not, and whether it is a request message or not, respectively. Except for this point, the operations of problem report collecting unit 64, support information collecting device 66 and request message collecting device 68 are the same.

In this manner, problem reports, support information and request messages come to be stored in problem report storage device 70, support information storage device 72 and request message storage device 74.

Every time a new piece of information is stored in problem report storage device 70 or support information storage device 72, problem report/support information matching device 76 conducts a matching process for the piece of information. If the new piece of information is a problem report, it performs matching against every piece of support information stored in support information storage device 72, and if the new piece of information is a piece of support information, it performs matching against every problem report stored in problem report storage device 70. Here, an operation of problem report/support information matching device 76 when a problem report is newly added to problem report storage device 70 will be described.

Referring to FIG. 3, when a new problem report is read from problem report storage device 70, feature calculating unit 130 reads pieces of support information stored in support information storage device 72, combines each piece with the new problem report and thus generates combinations of problem report and support information. Further, feature calculating unit 130 calculates features using the data stored in storage device 82 for every combination, and generates feature vectors. These features include, in addition to all the features used by problem report collecting unit 64, presence/absence of a common word in the nouns forming "noun+predicate" and presence/absence of a common semantic class, and further include the score provided at the time of determination by SVM 102 (see FIG. 2) of problem report collecting unit 64.

SVM 132 receives the feature vector generated by feature calculating unit 130, determines whether or not a problem report and support information included in the combination corresponding to the feature vector match each other, and outputs a result of determination.

Selecting unit 134 adds the combination of which determination by SVM 132 is positive to association information DB 80, and if not, it does not do anything.

If the information newly read by problem report/support information matching device 76 is a piece of support information, problem report/support information matching device 76 performs an operation corresponding to the above, with the support information and the problem report switched.

In this manner, by problem report/support information matching device 76, mutually matching problem reports and pieces of support information are associated and stored in association information DB 80.

Request message/support information matching device 78 operates in the similar manner. Therefore, details of the operation of request message/support information matching device 78 will not be repeated. The features used by the SVM of request message/support information matching device 78 are the same as those used by problem report/support information matching device 76. By request message/support information matching device 78, mutually matching support information and request messages are associated with each other and stored in association information DB 80.

In this manner, match information of mutually matching problem reports and support information, and match information of mutually matching support information and request messages come to be stored in association information DB 80. Once such pieces of match information are stored, these pieces of information can be used in various ways. The process executed by output generating unit 84 in the present embodiment is only an example of using the match information. There would be various and many ways to utilize such information.

Assume that a user, who is going to use information matching system 30 in accordance with the present embodiment, faces a problem and wishes to know a solution to the problem. In order to use the information matching system 30, the user has the screen 220 shown in FIG. 4 displayed on his/her terminal. By way of example, the screen is displayed when the user accesses a URL for using information matching system 30 through a browser.

The user enters a message representing the problem he/she faces, information related to the support he/she is willing to offer, or some request, to message input field 230, and enters search conditions to input panels 232 and 234 as needed. When the user clicks search button 236, a search request having the message text and the input search conditions as parameters is transmitted to web server 86 of information matching system 30.

Referring to FIG. 1, receiving the search request, web server 86 passes the message text and the input search condition as parameters to output generating unit 84. Output generating unit 84 passes the parameters to the program of which control structure is shown in FIG. 6, and thereby activates this program.

Referring to FIG. 6, output generating unit 84 performs morphological analysis (step 290), dependency analysis (step 292) and the place specifying process (step 294) on the input message, and stores the input message and the information obtained through steps 290, 292 and 294 in information storage device 60 shown in FIG. 1. If a search condition is input, it is added to the message such as "on (day) (month)" "at (place)".

Every time a new piece of information is stored in information storage device 60, problem report collecting unit 64, support information collecting device 66 and request message collecting device 68 collect problem reports, support information and request messages, respectively, and store these in problem report storage device 70, support information storage device 72 and request message storage device 74, respectively.

Every time a new problem report or a new piece of support information is stored in problem report storage device 70 or support information storage device 72, problem report/support information matching device 76 searches for a matching piece of support information or a matching problem report from support information storage device 72 and problem report storage device 70, respectively, and stores information associating matching pieces of information in association information DB 80. Similarly, every time a new piece of information is stored in support information storage device 72 or in request message storage device 74, request message/support information matching device 78 reads a matching request message or a matching piece of support information from request message storage device 74 and support information storage device 72, respectively, and stores information associating matching pieces of information in association information DB 80. Output generating unit 84 searches association information DB 80 and extracts pieces of information associated with the input message, and displays these pieces of information in the form of a list, on matching information display panel 262 of FIG. 5. If there is much associated information, matching information display panel 262 is made scrollable. Further, output generating unit 84 displays, for each piece of information displayed on matching information display panel 262, a pin 266 or the like at a position where each piece of information is dispatched, or a position where each piece of information is associated, on map panel 264.

In this manner, not only the pieces of information matching the input message but also positions where such matching pieces of information are dispatched are displayed on the map. Therefore, it is possible to easily grasp where/what problems are posed, what support is provided, or what requests are made. Therefore, it becomes possible to efficiently solve one's problem, to efficiently utilize supports, or to direct relief with priority to regions in higher need.

When a display such as that shown in FIG. 5 is given, it is desirable to remove problems already solved, problem reports met by necessary relief already delivered at the time of a disaster, or support information related to already completed distribution of relief goods. For this purpose, distribution destinations of support goods may be determined based on a screen such as shown in FIG. 5 and contacts may be made to support providers. Further, the example shown in FIG. 5 may be adapted to enable inputting of a flag indicating completion, for each of the problems solved by such a procedure, support information related to exhausted relief goods and satisfied request messages. By adding such flags to the pieces of information stored in problem report storage device 70, support information storage device 72 and request message storage device 74 as well as the match information stored in association information DB 80, already solved problem reports, satisfied request messages and support information of completed support work are withdrawn from the display of screen 250 shown in FIG. 5.

Since such a configuration is used, it is possible to find a match between a problem or request and its solution even in an ever-changing environment.

Effects of the Embodiment

One of the examples of use attaining the highest effect of the system in accordance with the present invention relates to smoothing of communication between victims and support groups. In the wake of a large-scale disaster, though problem reports and request messages from victims are posted through Twitter and other systems, such pieces of information tend to be buried in huge number of tweets, as described above. The same is true for the pieces of information issued by support groups and the like. Such phenomenon leads to a problem that while victims need support information, it is difficult to get such information. On the other hand, for the support groups, it leads to a problem that they cannot find those who are most in need of help. Even if support groups can recognize requests and problems of victims, without knowing which problem has been solved and which is pending, resources and time would be wasted as a number of support groups rush to meet the same request or problems.

The present embodiment solves such a problem. The technique of specifying and collecting problem reports, request messages and support information prevents necessary information from being buried, makes it easier for victims to get support information and contributes to easier comprehension by the support groups of problems and requests of the victims. Further, the problem report/support information matching technique or the request message/support information matching technique enables a victim to find support information directly related to the problem report he/she posted and to reply to it. For the support groups, by distinguishing problem reports or request messages matched with support information from problem reports or request messages for which matching information has not been found, it becomes possible to have an overview as to what problems or requests have been solved and what remains unsolved. This contributes to reduction of wasted time and resources of support groups.

Use of the system of the embodiment described above and its concept are not limited to the time of disasters. The system and the concept are valuable also in day-to-day commercial use. By way of example, based on the same idea as in the embodiment above, it is possible to create a search system that provides, when a user inputs a problem related to his/her computer, a problem related to a disease or some request, solutions as support information automatically in the form of a list, using information on the web as sources.

In the embodiment described above, problem report storage device 70, support information storage device 72 and request message storage device 74 have been described as mutually separate devices. It is possible to store these in one storage device. All of these may be stored in one same file. In short, what is necessary is that pieces of information belonging to different categories can be distinguished from each other. By way of example, it is sufficient to add a piece of information indicating such category to each record in the file.

Currently, a question-answering system provided by speech on a smart-phone is in the spotlight. In order to have a problem solved using the question-answering system, it is necessary to consider what type of question should be presented. Special knowledge is often necessary to consider appropriate questions. The embodiment above enables search of support information directly from a problem. Therefore, it can be a pioneer in developing a next-generation technique of question-answering system, and it is important in that it contributes to development of new services.

[Results of Experiments]

We conducted a number of experiments to verify the effects of the above-described embodiment. Experimental results and comparative examples will be discussed below. Tables 5, 6 and 7 show results of experiments related to accuracy of specifying problem reports, support information and request messages.

TABLE 5

Specifying problem report:

| Determination method | Recall rate R (%) | Precision P (%) | F value (%) |
|---|---|---|---|
| Embodiment | 44.26 | 79.41 | 56.83 |
| Comparative Example 1 | 45.08 | 74.83 | 56.26 |
| Comparative Example 2 | 43.42 | 75.97 | 55.25 |
| Comparative Example 3 | 43.14 | 77.83 | 55.50 |

TABLE 6

Specifying request messages:

| Determination method | Recall rate R (%) | Precision P (%) | F value (%) |
|---|---|---|---|
| Embodiment | 48.84 | 91.30 | 63.63 |
| Comparative Example 1 | 32.56 | 93.33 | 48.27 |
| Comparative Example 2 | 47.79 | 88.46 | 61.80 |
| Comparative Example 3 | 48.64 | 89.27 | 62.96 |

TABLE 7

Specifying support information:

| Determination method | Recall rate R (%) | Precision P (%) | F value (%) |
|---|---|---|---|
| Embodiment | 53.82 | 65.67 | 59.01 |
| Comparative Example 1 | 51.38 | 63.88 | 56.95 |
| Comparative Example 2 | 52.60 | 65.45 | 58.32 |
| Comparative Example 3 | 51.99 | 65.64 | 58.02 |

In Tables 5 to 7 above, in "Embodiment," classification (trouble/non-trouble) of nouns in the cores (problem core, support core, request core) in messages, polarities (excitatory/inhibitory) of predicates, evaluation expression, evaluation type and evaluation polarity of messages obtained by using the evaluation expression dictionary, semantic classes of the nouns in cores, and n-grams including nouns in cores in the dependency relation of messages, in accordance with the core-based matrix as described above are used. Comparative Example 1 shows results of experiment conducted by the same method as the embodiment but not using the noun classification (trouble/non-trouble) and core predicate polarity (excitatory/inhibitory) as the features of SVM, that is, the results obtained when the features related to the core-based matrix were not used. Comparative Example 2 shows results of determination conducted by the same method as the embodiment but not using the features obtained by using the evaluation expression dictionary. Comparative Example 3 shows results of determination conducted by the same method as the embodiment but not using the semantic classes as features.

Experiment of each SVM was done with 13,000 training data, and as test data, 1,000 data extracted at random from pre-collected data were used. Evaluation was done by three persons not including the inventors. Fleiss' Kappa of evaluations by the evaluators was 0.74, indicating that evaluations by the evaluators were highly consistent.

Table 8 shows the results of matching experiments related to matching between problem reports and support information as an example.

TABLE 8

Matching (Problem Reports-Support Information)

| Determination method | Recall rate R (%) | Precision P (%) | F value (%) |
|---|---|---|---|
| Embodiment | 30.67 | 70.42 | 42.92 |
| Comparative Example 1 | 28.83 | 67.14 | 40.33 |
| Comparative Example 2 | 26.99 | 67.69 | 38.59 |
| Comparative Example 3 | 30.61 | 69.51 | 42.50 |

In the experiments, problem report/support information matching device 76 was trained with 9,000 training data, and 1,000 test data were used. The test data was selected such that frequency of occurrence of one noun was at most 30 times, from prepared data. As in the case of experiments for the problem report, evaluation was done by three persons not including the inventors. Fleiss' Kappa of evaluations was 0.63, again indicating that evaluations by the evaluators were sufficiently consistent.

As described above, in the system of the present embodiment, it is possible to match and present various types of information, for example, problem reports and solutions thereof, from vast amount of information on the network. Therefore, as compared with the search service merely using keyword search, it is possible to find information wanted by the user with very high accuracy and, hence, this technique is expected to be widely used both within and between countries, in place of the conventional search services. In the wake of a large-scale disaster, administrative agencies, NPOs, volunteer groups and the like can make use of the system as described in the embodiment above to realize smooth communication with victims. As compared with the conventional chaotic situation in which pieces of information such as problems and solutions or requests and answers exist unrelated to each other, by the embodiment above, explicit relations can be found between these pieces, and pieces of information can be presented to the user in a much more organized manner.

[Hardware Configuration]

Figure 7:
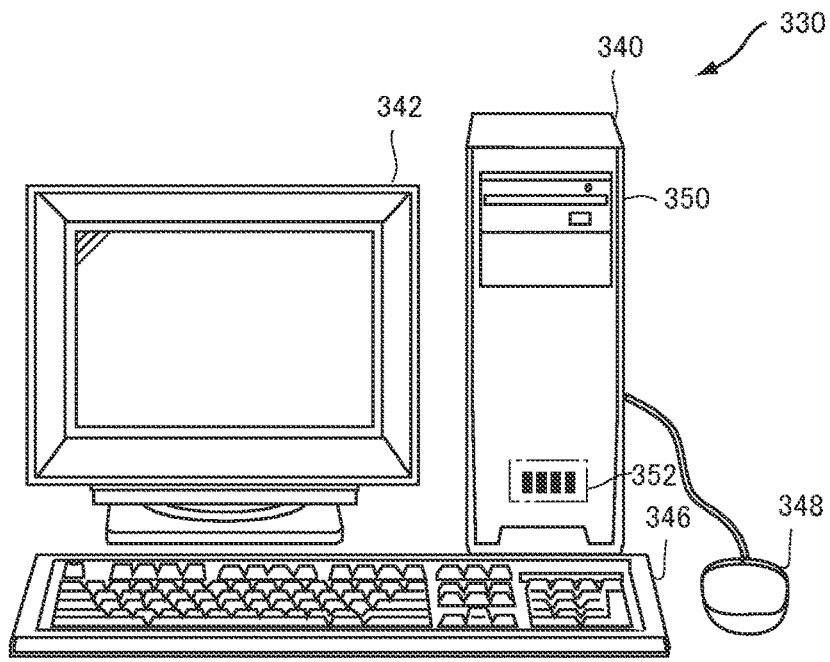
FIG. 7 is a schematic diagram of a computer system realizing the system in accordance with an embodiment of the present invention.

Information matching system 30 in accordance with the embodiment above can be implemented by computer hardware and the above-described computer program running on the computer hardware. FIG. 7 shows an appearance of computer system 330 and FIG. 8 shows an internal configuration of computer system 330.

Referring to FIG. 7, computer system 330 includes a computer 340 having a memory port 352 and a DVD (Digital Versatile Disc) drive 350, a keyboard 346, a mouse 348 and a monitor 342.

Figure 8:
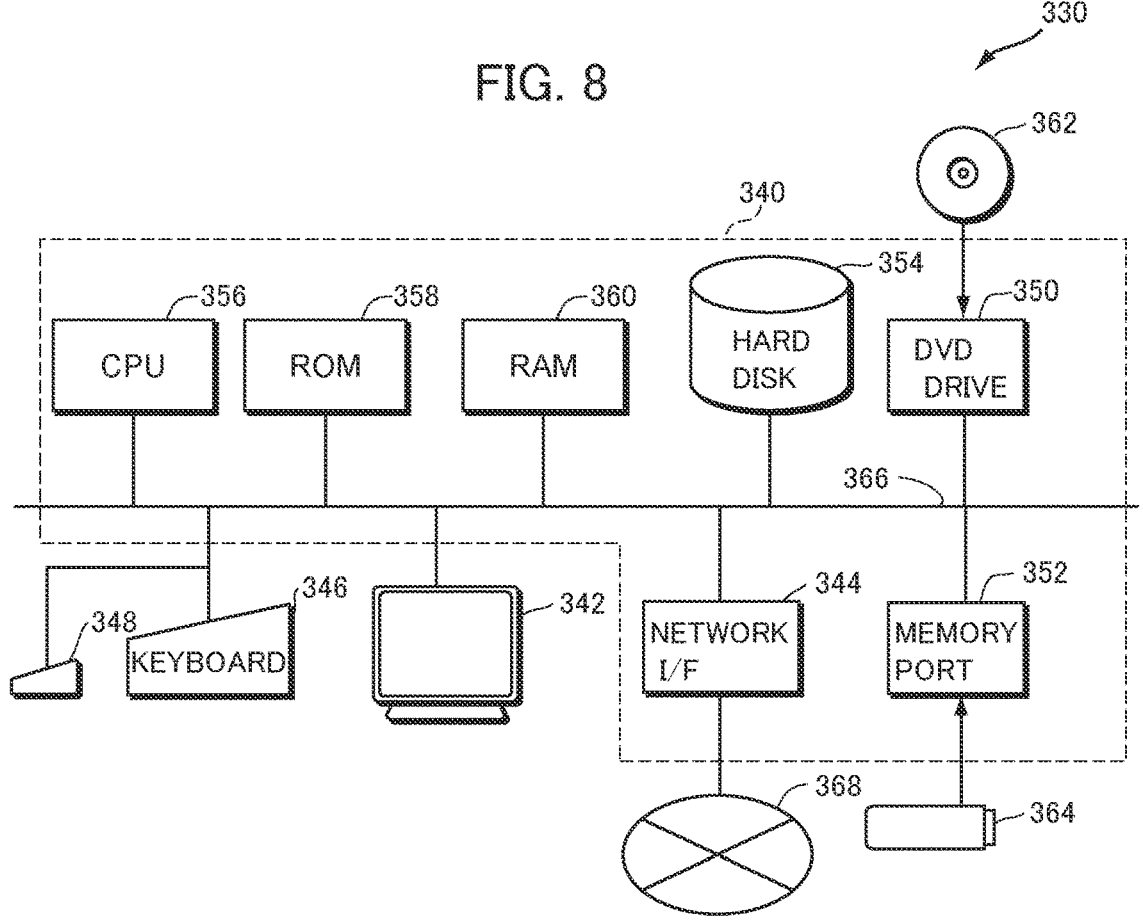
FIG. 8 is a block diagram showing a hardware configuration of the computer system shown in FIG. 7.

Referring to FIG. 8, in addition to memory port 352 and DVD drive 350, computer 340 includes a CPU (Central Processing Unit) 356, a bus 366 connected to CPU 356, memory port 352 and DVD drive 350, a read-only memory (ROM) 358 for storing a boot program and the like, a random access memory (RAM) 360 connected to bus 366 and storing program instructions, a system program and work data, and a hard disk 354. Computer system 330 further includes a network interface (I/F) 344 providing a connection to a network 368, enabling communication with other terminals.

The computer program causing computer system 330 to function as various functional units of information matching system 30 in accordance with the above-described embodiment is stored in a DVD 362 or removable memory 364 loaded to DVD drive 350 or memory port 352, and transferred to hard disk 354. Alternatively, the program may be transmitted to computer 340 through network 368 and stored in hard disk 354. The program is loaded to RAM 360 at the time of execution. The program may be directly loaded to RAM 360 from removable memory 364, or through network 368.

The program includes a sequence of instructions consisting of a plurality of instructions causing computer 340 to function as various functional units of information matching system 30 in accordance with the embodiment above. Some of the basic functions necessary to cause computer 340 to operate in this manner may be provided by the operating system running on computer 340, by a third-party program, or various programming tool kits or program library installed in computer 340. Therefore, the program itself may not include all functions to realize the system and method of the present embodiment. The program may include only the instructions that call appropriate functions or appropriate program tools in the programming tool kits in a controlled manner to attain a desired result and thereby to realize the functions of the system described above. Naturally, the program itself may provide all necessary functions.

In the embodiment above, information storage device 60, storage device 62, problem report storage device 70, support information storage device 72, request message storage device 74, storage device 82 and the like are implemented by RAM 360 or hard disk 354. Values therein may further be stored in removable memory 364 such as a USB memory, or may be transmitted to another computer through a communication medium such as a network. Similarly, association information DB 80 is implemented by RAM 360, hard disk 354 and a database management program executed by CPU 356. A commercially available database management program and a so-called open source database management program may be used.

The operation of computer system 330 executing the computer program is well known. Therefore, details thereof will not be repeated here.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to an industry of providing services for efficiently providing necessary information to users who needs certain information, by matching pieces of information posted on various systems on a network, as well as to an industry providing facilities for such services.

REFERENCE SIGNS LIST 30 information matching system
40 Internet
50 information collecting unit
52 morpheme analyzing unit
54 dependency analyzing unit
56 place-name/location dictionary storage device
58 place-name/location specifying unit
60 information storage device
62 storage device storing data for generating features-for-classification 64 problem report collecting unit
66 support information collecting unit
68 request message collecting unit
70 problem report storage device
72 support information storage device
74 request message storage device
76 problem report/support information matching device
78 request message/support information matching device
80 association information DB
82 storage device storing data for generating features-for-matching
84 output generating unit
86 web server
100, 130 feature calculating unit
102, 132 SVM
104, 134 selecting unit

The invention claimed is:

1. A text matching device, matching, in a set of texts classified to a first or second category, a text in said first category with a text in said second category, wherein
a text included in said set is classified to said first or second category by a text classifying device using machine learning, using features of the text being classified,
the features include one or a plurality of morphemes forming the text, dependency information of the one or a plurality of morphemes, and a combination of a noun classification and a predicate classification in a core of a sentence consisting of a combination of a noun included in said text and a predicate on which the noun depends;
said text matching device comprising:
memory for storing texts classified to said first category and said second category;
a processor configured to:
generate a text pair consisting of a text classified to said first category and a text classified to said second category;
generate from said text pair features-for-matching, wherein the features-for-matching include a combination of said features used to classify the text forming said text pair; and
determine using a machine learning model whether the two texts forming said pair match using the features-for-matching as an input to the machine learning model;
wherein said machine learning model is pre-trained using training data in advance to determine whether a pair of texts matches based on said features-for-matching.

2. The text matching device according to claim 1, wherein
said features-for-matching further include n-grams on a sub-tree of a dependency relation including a noun in said core; and
any of said n-grams includes a piece of time information, a piece of regional information, a morpheme representing modality of each text, or an arbitrary combination of these.

3. The text matching device according to claim 1, wherein one of said first and second categories is a category comprised of texts representing problem reports, and the other is a category comprised of texts representing support information for solving problems.

4. The text matching device according to claim 1, wherein one of said first and second categories is a category comprised of texts representing requests for solving problems, and the other is a category comprised of texts representing support information for solving problems.

5. A text matching and classification system comprising:
the text matching device of claim 1; and
a text classifying device for classifying a text to a specific category related to problem report or solution, the text classifying device including a processor configured to:
perform morphological analysis of said text and output a sequence of morphemes with a piece of part-of-speech information;
analyze dependency between the outputted morphemes of the sequence of morphemes, and output a piece of dependency information representing dependency relation of said text; and
specify based on said sequence of morphemes and said dependency relation of text, a core of a sentence consisting of a noun included in said text and a predicate on which said noun depends, and classify said text to said specific category or to another category, using a combination of classification of the noun in said core and classification of the predicate.

6. The text classifying device according to claim 5, wherein the processor is further configured to:
specify, based on said sequence of morphemes and said dependency relation of the text, a core of a sentence consisting of a noun included in said text and a predicate on which said noun depends;
classify a noun in the specified core to a problem-noun related to occurrence of a problem or a non-problem-noun unrelated to occurrence of a problem;
classify a predicate in the specified core to a predicate indicating that an object function represented by the noun depending on the predicate becomes excitatory, or a predicate indicating that the object function becomes inhibitory; and
for the specified core, classify said text to said specific category or to another category, based on a combination of a result of the classification of the noun in said core and a result of the classification of the predicate on which the noun depends.

7. The text classifying device according to claim 6, wherein
the classifying of said text to said specific category or to another category includes using machine learning to determine whether a given text belongs to said specific category or not, using as features at least a piece of information representing, for the specified core, a combination of a result of the classification of the noun in the core and a result of the classification of the predicate on which the noun depends in the core.

8. The text matching device according to claim 7, wherein
said features further include n-grams on a sub-tree of a dependency relation including a noun in said core found for each said text; and
any of said n-grams includes a piece of time information, a piece of regional information, a morpheme representing modality of each text, or an arbitrary combination of these.

9. A text matching method of matching, in a set of texts classified to a first or second category, a text in said first category with a text in said second category, wherein
a text included in said set is classified to said first or second category by a text classifying device using machine learning, using features of the text being classified,
the features include one or a plurality of morphemes forming the text, dependency information of the one or a plurality of morphemes, and a combination of a noun classification and a predicate classification in a core of a sentence consisting of a combination of a noun included in said text and a predicate on which the noun depends;

said text matching method comprising:
- the step of storing texts classified to said first category and said second category;
- text pair generating step of generating a text pair consisting of a text classified to said first category and a text classified to said second category;
- features-for-matching generating step of generating, from said text pair, features-for-matching, wherein the features-for-matching include a combination of said features used to classify the text forming said text pair; and
- matching step of determining using a machine learning model whether the two texts forming said pair match using the features-for-matching as an input to the machine learning model;
- wherein said machine learning model is pre-trained using training data in advance to determine whether a pair of texts matches based on said features-for-matching.

10. A text matching and classification system method comprising:
- the text matching method of claim 9; and
- a text classifying method for classifying a text to a specific category related to problem report or solution, the text classifying method including:
  - morpheme analyzing step of performing morphological analysis of said text and outputting a sequence of morphemes with a piece of part-of-speech information;
  - dependency analyzing step of analyzing dependency between the outputted morphemes of the sequence of morphemes, and outputting a piece of dependency information representing dependency relation of said text; and
  - classifying step of specifying, based on said sequence of morphemes and said dependency relation of text, a core of a sentence consisting of a noun included in said text and a predicate on which said noun depends, and classifying said text to said specific category or to another category, using a combination of classification of the noun in said core and classification of the predicate.

11. The text matching device according to claim 2 wherein one of said first and second categories is a category comprised of texts representing problem reports, and the other is a category comprised of texts representing support information for solving problems.

12. The text matching device according to claim 2, wherein one of said first and second categories is a category comprised of texts representing requests for solving problems, and the other is a category comprised of texts representing support information for solving problems.

* * * * *